US012626396B2

(12) United States Patent
Chang et al.

(10) Patent No.: US 12,626,396 B2
(45) Date of Patent: May 12, 2026

(54) ELECTRONIC DEVICE AND CONTROLLING METHOD OF ELECTRONIC DEVICE

(71) Applicant: Samsung Electronics Co., Ltd., Suwon-si (KR)

(72) Inventors: Jaesik Chang, Suwon-si (KR); Minju Kim, Suwon-si (KR); Heungwoo Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 18/194,205

(22) Filed: Mar. 31, 2023

(65) Prior Publication Data

US 2023/0245344 A1 Aug. 3, 2023

Related U.S. Application Data

(63) Continuation of application No. PCT/KR2021/016060, filed on Nov. 5, 2021.

(30) Foreign Application Priority Data

Nov. 6, 2020 (KR) ........................ 10-2020-0147389
Feb. 26, 2021 (KR) ........................ 10-2021-0026660

(51) Int. Cl.
*G06K 9/00* (2022.01)
*G06T 7/50* (2017.01)
(Continued)

(52) U.S. Cl.
CPC .................. *G06T 7/73* (2017.01); *G06T 7/50* (2017.01); *G06T 7/68* (2017.01); *G06V 10/82* (2022.01); *G06T 2207/10024* (2013.01)

(58) Field of Classification Search
CPC .... G06T 7/73; G06T 7/50; G06T 7/68; G06T 2207/10024; G06T 2207/10012;
(Continued)

(56) References Cited

U.S. PATENT DOCUMENTS 6,549,289 B1 4/2003 Ellis
8,755,630 B2 6/2014 Hwang et al.
(Continued)

FOREIGN PATENT DOCUMENTS

JP 2000-339463 A 12/2000
JP 2017007009 A * 1/2017
(Continued)

OTHER PUBLICATIONS

Frequency-Based 3D Reconstruction of Transparent and Specular Objects, Ding Liu et al., CVF, 2014, pp. 1-8 (Year: 2014).*
(Continued)

*Primary Examiner* — Jayesh A Patel
(74) *Attorney, Agent, or Firm* — Jefferson IP Law, LLP

(57) ABSTRACT

An electronic device and a control method of an electronic device are provided. The method acquiring a plurality of images through at least one camera, inputting red green blue (RGB) data for each of the plurality of images into a first neural network model to obtain two-dimensional pose information on an object included in the plurality of images, inputting RGB data for at least one image of the plurality of images into a second neural network model to identify whether the object is transparent, if the object is a transparent object, performing stereo matching based on the two-dimensional pose information on each of the plurality of images to obtain three-dimensional pose information on the object, and if the object is an opaque object, acquiring three-dimensional pose information on the object based on one image of the plurality of images and depth information corresponding to the one image.

14 Claims, 9 Drawing Sheets

(51) Int. Cl.

| | | |
|---|---|---|
| *G06T 7/68* | (2017.01) | |
| *G06T 7/73* | (2017.01) | |
| *G06V 10/82* | (2022.01) | |

(58) Field of Classification Search
CPC . G06T 2207/20081; G06T 2207/20084; G06T 7/593; G06V 10/82; G06V 10/751; G06V 10/764; G06V 20/64

See application file for complete search history.

(56) References Cited

U.S. PATENT DOCUMENTS

| | | | |
|---|---|---|---|
| 9,349,075 B2 | 5/2016 | Jung et al. | |
| 10,204,287 B2 | 2/2019 | Jung et al. | |
| 10,733,422 B2 | 8/2020 | Rhee et al. | |
| 11,386,701 B2 | 7/2022 | Rhee et al. | |
| 2012/0114175 A1 | 5/2012 | Hwang et al. | |
| 2013/0301907 A1* | 11/2013 | Shim | G01B 11/02 |
| | | | 382/154 |
| 2014/0112531 A1* | 4/2014 | Jung | H04N 23/00 |
| | | | 382/103 |
| 2016/0253580 A1 | 9/2016 | Jung et al. | |
| 2016/0379041 A1 | 12/2016 | Rhee et al. | |
| 2018/0268601 A1 | 9/2018 | Rad et al. | |
| 2019/0286884 A1 | 9/2019 | Rhee et al. | |
| 2020/0285837 A1 | 9/2020 | Rhee et al. | |
| 2020/0311956 A1* | 10/2020 | Choi | G06V 10/454 |
| 2020/0327378 A1* | 10/2020 | Smith | G06N 5/048 |
| 2020/0402251 A1 | 12/2020 | Ban et al. | |
| 2021/0306615 A1 | 9/2021 | Jeong et al. | |
| 2022/0092330 A1 | 3/2022 | Amano et al. | |

FOREIGN PATENT DOCUMENTS

| | | | |
|---|---|---|---|
| JP | 2018-017653 A | 2/2018 | |
| JP | 2018-159671 A | 10/2018 | |
| KR | 10-0920931 B1 | 10/2009 | |
| KR | 10-2017-0000748 A | 1/2017 | |
| KR | 10-1751697 B1 | 6/2017 | |
| KR | 10-1791590 B1 | 10/2017 | |
| KR | 101893771 B1 * | 8/2018 | G01B 11/02 |
| KR | 10-1932595 B1 | 12/2018 | |
| KR | 101963042 B1 * | 3/2019 | G06T 7/50 |
| KR | 10-2019-0102906 A | 9/2019 | |
| KR | 10-2020-0071990 A | 6/2020 | |
| WO | WO-2016103286 A1 * | 6/2016 | G06T 7/0008 |
| WO | 2020/144784 A1 | 7/2020 | |

OTHER PUBLICATIONS

Transparent object detection and location based on RGB-D camera, Chen Guo-Hua et al., IOP, 2011, pp. 1-11 (Year: 2011).*

ClearGrasp: 3D Shape Estimation of Transparent Objects for Manipulation, Shreeyak Sajjan et al., IEEE, 2020, pp. 3634-3642 (Year: 2020).*

A Hybrid Deep Architecture for Robotic Grasp Detection, Di Guo, Fuchun Sun et al., IEEE, 2017, pp. 1609-1614 (Year: 2017).*

Transparent Object Detection and Reconstruction on a Mobile Platform, Ulrich Klank et al., IEEE, 2011, pp. 5971-5978 (Year: 2011).*

Transparent and Specular Object Reconstruction, Ivo Ihrke et al., Computer Graphics, 2010, pp. 2400-2426 (Year: 2010).*

Object pose: Perceiving 3-D shape as sticks and slabs, Augustinus H. J. Oomes et al., 2002, pp. 507-520 (Year: 2002).*

Extended European Search Report dated Nov. 30, 2023, issued in European Patent Application No. 21889629.8.

Liu et al., KeyPose: Multi-View 3D Labeling and Keypoint Estimation for Transparent Objects, May 18, 2020.

Wang et al., DenseFusion: 6D Object Pose Estimation by Iterative Dense Fusion, 2019 IEEE/CVF Conference on Computer Vision and Pattern Recognition (CVPR).

International Search Report dated Feb. 16, 2022, issued in International Patent Application No. PCT/KR2021/016060.

Korean Office Action dated Dec. 1, 2025, issued in Korean Application No. 10-2021-0026660.

* cited by examiner

ELECTRONIC DEVICE AND CONTROLLING METHOD OF ELECTRONIC DEVICE

CROSS-REFERENCE TO RELATED APPLICATION(S)

This application is a continuation application, claiming priority under § 365(c), of an International application No. PCT/KR2021/016060, filed on Nov. 5, 2021, which is based on and claims the benefit of a Korean patent application number 10-2020-0147389, filed on Nov. 6, 2020, in the Korean Intellectual Property Office, and of a Korean patent application number 10-2021-0026660, filed on Feb. 26, 2021, in the Korean Intellectual Property Office, the disclosure of each of which is incorporated by reference herein in its entirety.

BACKGROUND

1. Field

The disclosure relates to an electronic device and a controlling method of the electronic device. More particularly, the disclosure relates to a device capable of acquiring three-dimensional (3D) pose information of an object included in an image.

2. Description of Related Art

A need for a technology for acquiring three-dimensional (3D) pose information on an object included in an image is highlighted recently. More particularly, development of technology for detecting an object included in an image and using 3D pose information for the detected object by using a neural network model, such as a convolutional neural network (CNN) has been accelerated recently.

However, when pose information on an object is acquired based on one image according to the prior art, it is difficult to acquire pose information of an object for which a 3D model has not been established, and particularly, it is difficult to acquire accurate pose information for a transparent object.

In addition, when pose information on an object is acquired based on a stereo camera according to the related art, there are limitations in that a range of distances that may be measured for acquisition of pose information is limited due to a narrow field of view difference between the two cameras, and when the positional relationship between the two cameras is changed, a trained neural network model may not be used with the premise that the positional relationship between the two cameras is fixed, or the like.

The above information is presented as background information only to assist with an understanding of the disclosure. No determination has been made, and no assertion is made, as to whether any of the above might be applicable as prior art with regard to the disclosure.

SUMMARY

Aspects of the disclosure is to address at least the above-mentioned problems and/or disadvantages and to provide at least the advantages described below. Accordingly, an aspect of the disclosure is to provide an electronic device capable of acquiring 3D pose information for an object in an efficient manner according to the features of an object included in an image, and a method for controlling the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes at least one camera, a memory, and a processor configured to acquire plurality of images through the least one camera, input red green blue (RGB) data for each of the plurality of images into a first neural network model to acquire two-dimensional pose information on an object included in the plurality of images, input RGB data for at least one image of the plurality of images into a second neural network model to identify whether the object is transparent, based on the object being a transparent object, perform stereo matching based on the two-dimensional pose information on each of the plurality of images to acquire three-dimensional pose information on the object, and based on the object being an opaque object, acquire three-dimensional pose information on the object based on one image of the plurality of images and depth information corresponding to the one image.

The processor may acquire information about transparency of the object through the second neural network model, and identify transparency of the object based on the information about the transparency of the object.

The processor may acquire information on whether the object is symmetrical through the second neural network model, identify whether the object is symmetrical based on the information on whether the object is symmetrical, based on the object being an object having symmetry, convert first feature points included in the two-dimensional pose information into second feature points unrelated to symmetry, and acquire three-dimensional pose information for the object by performing the stereo matching based on the second feature points.

Based on the object being an object having symmetry, the first feature points are identified based on a three-dimensional coordinate system in which x-axis or y-axis is perpendicular to the at least one camera.

The plurality of images are two images acquired at two different points in time through a first camera among the at least one camera.

The plurality of images are two images acquired at same points in time through each of the first camera and the second camera among the at least one camera.

The processor may acquire first location information about a positional relationship between the first camera and the second camera, perform the stereo matching based on the two-dimensional pose information for each of the plurality of images and the first location information.

The electronic device may further include a driver, and the processor may control the driver to change a position of at least one of the first camera and the second camera, acquire second position information about a positional relationship between the first camera and the second camera based on the changed position of the at least one camera, perform the stereo matching based on the two-dimensional pose information for each of the plurality of images and the second location information.

The first neural network model and the second neural network model are included in one integrated neural network model.

In accordance with another aspect of the disclosure, a method of controlling the electronic device is provided. The method of controlling the electronic device includes acquiring plurality of images through at least one camera, inputting RGB data for each of the plurality of images into a first neural network model to acquire two-dimensional pose information on an object included in the plurality of images, inputting RGB data for at least one image of the plurality of images into a second neural network model to identify whether the object is transparent, based on the object being a transparent object, performing stereo matching based on the two-dimensional pose information on each of the plurality of images to acquire three-dimensional pose information on the object, and based on the object being an opaque object, acquiring three-dimensional pose information on the object based on one image of the plurality of images and depth information corresponding to the one image.

The identifying transparency of the object may include acquiring information about transparency of the object through the second neural network model, and identifying transparency of the object based on the information about the transparency of the object.

The identifying symmetry of the object may include acquiring information on whether the object is symmetrical through the second neural network model, and identifying whether the object is symmetrical based on the information on whether the object is symmetrical, and the control method of the electronic device further includes, based on the object being an object having symmetry as a result of identification, converting first feature points included in the two-dimensional pose information into second feature points unrelated to symmetry, and acquiring three-dimensional pose information for the object by performing the stereo matching based on the second feature points.

Based on the object being an object having symmetry, the first feature points are identified based on a three-dimensional coordinate system in which x-axis or y-axis is perpendicular to the at least one camera.

The plurality of images are two images acquired at two different points in time through a first camera among the at least one camera.

The plurality of images are two images acquired at same points in time through each of the first camera and the second camera among the at least one camera.

The method may further include acquiring first location information about a positional relationship between the first camera and the second camera, performing the stereo matching based on the two-dimensional pose information for each of the plurality of images and the first location information.

The method may further include controlling the driver to change a position of at least one of the first camera and the second camera, acquiring second position information about a positional relationship between the first camera and the second camera based on the changed position of the at least one camera, performing the stereo matching based on the two-dimensional pose information for each of the plurality of images and the second location information.

The first neural network model and the second neural network model are included in one integrated neural network model.

In accordance with another aspect of the disclosure, a non-transitory computer readable recordable medium including a program for executing a control method of an electronic device is provided. The method includes acquiring plurality of images through the least one camera, inputting RGB data for each of the plurality of images into a first neural network model to acquire two-dimensional pose information on an object included in the plurality of images, inputting RGB data for at least one image of the plurality of images into a second neural network model to identify whether the object is transparent, based on the object being a transparent object, performing stereo matching based on the two-dimensional pose information on each of the plurality of images to acquire three-dimensional pose information on the object, and based on the object being an opaque object, acquiring three-dimensional pose information on the object based on one image of the plurality of images and depth information corresponding to the one image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a block diagram illustrating neural network models and modules according to an embodiment of the disclosure.

Throughout the drawings, like reference numerals will be understood to refer to like parts, components, and structures.

DETAILED DESCRIPTION

Figure 1:
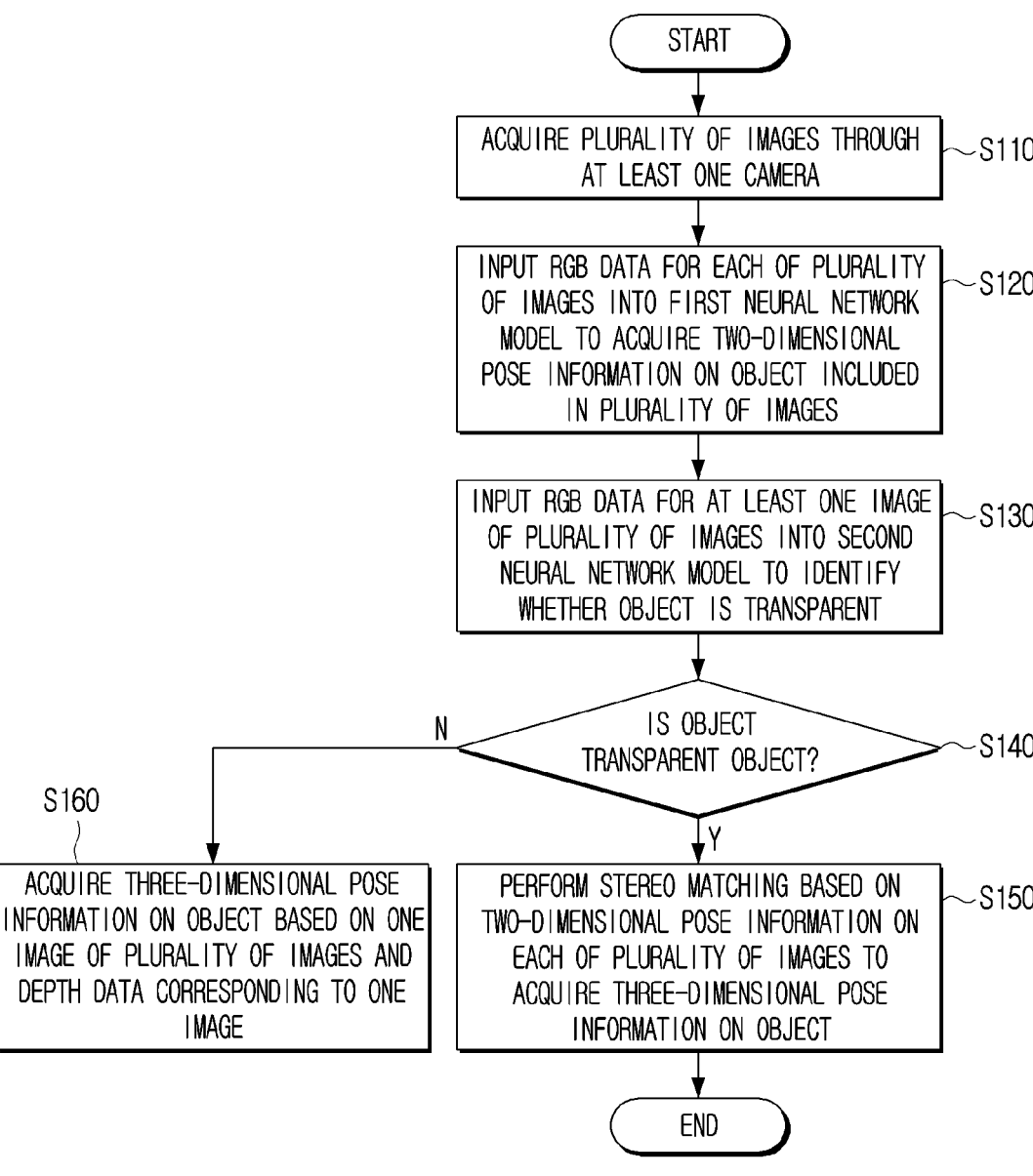
FIG. 1 is a flowchart illustrating a method for controlling an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, a descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this specification, expressions, such as "have," "may have," "include," "may include" or the like represent presence of a corresponding feature (for example, components, such as numbers, functions, operations, or parts) and does not exclude the presence of additional feature.

In this disclosure, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, or (3) at least one A and at least one B together.

In this disclosure, the terms "first," "second," and so forth are used to describe diverse elements regardless of their order and/or importance, and to discriminate one element from other elements, but are not limited to the corresponding elements.

It is to be understood that an element (e.g., a first element) that is "operatively or communicatively coupled with/to" another element (e.g., a second element) may be directly connected to the other element or may be connected via another element (e.g., a third element).

Alternatively, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of" The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processing unit (CPU) or application processor (AP)) that can perform the corresponding actions by executing one or more software programs stored in the memory device.

The term, such as "module," "unit," "part", and so on may refer, for example, to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

It is understood that various elements and regions in the figures may be shown out of scale. Accordingly, the scope of the disclosure is not limited by the relative sizes or spacing drawn from the accompanying drawings.

Hereinafter, with reference to the attached drawings, various example embodiments will be described so that those skilled in the art can easily practice.

FIG. 1 is a flowchart illustrating a method for controlling an electronic device according to an embodiment of the disclosure.

Figure 2:
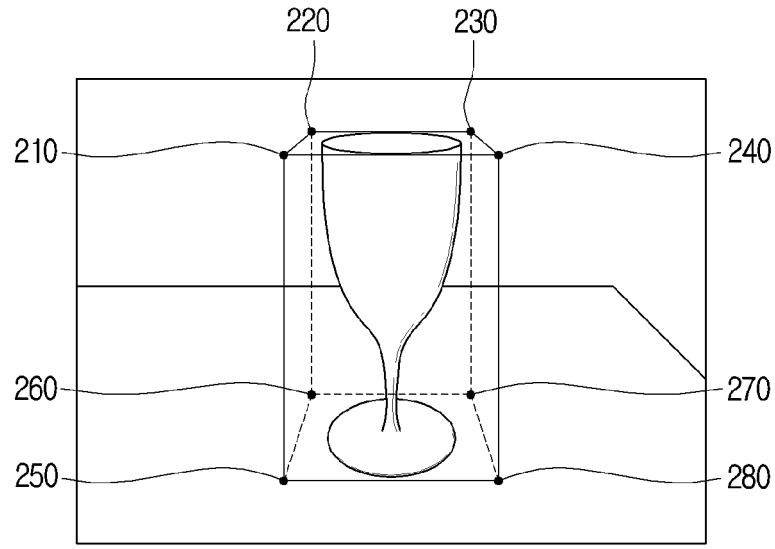
FIGS. 2 and 3 are views illustrating a plurality of images and two-dimensional pose information according to various embodiments of the disclosure.
Figure 3:
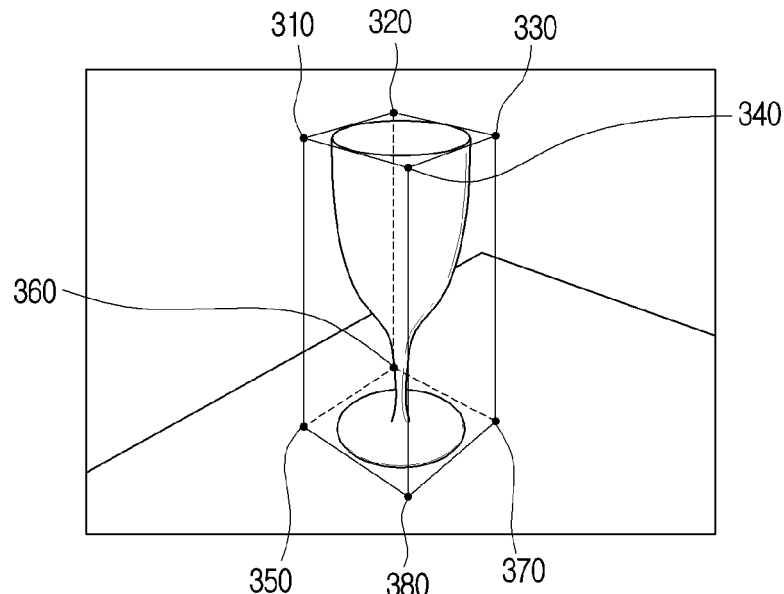

FIGS. 2 and 3 are views illustrating a plurality of images and two-dimensional pose information according to various embodiments of the disclosure.

An electronic device according to the disclosure refers to a device capable of acquiring 3D pose information for an object included in an image. More particularly, the electronic device according to the disclosure may acquire 3D pose information in various ways according to features of an object included in an image. For example, the electronic device according to the disclosure may be implemented as a user terminal, such as a smartphone or a tablet personal computer (PC), and may also be implemented as a device, such as a robot. Hereinafter, an electronic device according to the disclosure is referred to as an "electronic device 100."

Referring to FIG. 1, an electronic device 100 may acquire a plurality of images through at least one camera in operation S110.

The electronic device 100 may include at least one camera, that is, one or more cameras. When the electronic device 100 includes two or more cameras, a positional relationship between the two or more cameras may be fixed and changed. For example, the electronic device 100 may include a camera disposed on the left side of the rear surface of the electronic device 100 and a camera disposed on the right side of the rear surface of the electronic device 100. When the electronic device 100 is implemented as a robot, at least one camera may include two cameras disposed on the head and the hand of the robot, that is, a head camera and a hand camera, and in this case, the positional relationship between the two cameras may be changed as the position of at least one of the head camera and the hand camera is changed.

The plurality of images may include the same object, and may be images acquired through one camera or two or more different cameras. Specifically, the plurality of images may be two images acquired at different time points through the first camera. In addition, the plurality of images may be two images acquired at the same time point through each of the first camera and the second camera. In other words, in the disclosure, a plurality of images may be different image frames included in a video sequence acquired through one camera, and may be different image frames according to a result of capturing the same scene through a camera having different views at the same time.

For example, when the electronic device 100 according to the disclosure is implemented as a robot, the images of FIGS. 2 and 3 indicate a first image and a second image acquired through a head camera and a hand camera of the robot, respectively. Specifically, referring to the example of FIGS. 2 and 3, each of the first image and the second image may include an object "wine glass", and an object "wine glass" may be disposed at different positions with different poses in each of the first image and the second image.

When a plurality of images are acquired, the electronic device 100 may input RGB data for each of a plurality of images into a first neural network model to acquire two-dimensional pose information for an object included in the plurality of images in operation S120.

The first neural network model refers to a neural network model trained to output two-dimensional pose information for an object included in an image based on input RGB data. In addition, the "two-dimensional pose information" is a term for collectively referred to as information for specifying the pose of an object in two dimensions. Particularly, the first neural network model may detect a bounding box corresponding to each object included in the image, and acquire two-dimensional coordinate information of each of preset feature points constituting the detected bounding box as two-dimensional pose information.

Referring to FIG. 2, a first neural network model may detect a three-dimensional bounding box corresponding to a wine glass in a first image, and acquire two-dimensional coordinate information corresponding to eight vertices (210, 220, 230, 240, 250, 260, 270, 280) constituting the detected bounding box as two-dimensional pose information. Similarly, referring to FIG. 3, a first neural network model may detect a three-dimensional bounding box corresponding to a wine glass in a second image, and acquire two-dimensional coordinate information corresponding to eight vertices (310, 320, 330, 340, 350, 360, 370, 380) constituting the detected bounding box as two-dimensional pose information. Although eight vertexes constituting a bounding box detected as an example of preset feature points are illustrated in the description of FIGS. 2 and 3, the disclosure is not limited thereto.

The electronic device 100 may identify whether an object is transparent by inputting RGB data for at least one image among a plurality of images to a second neural network model in operation S130.

The second neural network model refers to a neural network model trained to classify features of an object included in an input image and output a result. Specifically, the second neural network model may output information on a probability that an object included in an image corresponds to each of a plurality of classes (or categories and domains) divided according to various features of the image based on the input RGB data. The electronic device 100 may identify a feature of an object included in the input image based on the information on the probability output from the second neural network model. Here, the plurality of classes may be predefined according to features, such as whether the object is transparent and whether the object is symmetrical.

The electronic device 100 may acquire information on whether an object is transparent through a second neural network model, and identify whether the object is transparent based on the information on whether the object is transparent. In the disclosure, that an object is "transparent" not only refers to a case where the transparency of an object is 100%, but also refers to a case where the transparency of an object is equal to or greater than a preset threshold value. Here, a preset threshold value may be set to distinguish a boundary between a degree of transparency, which may acquire depth information by a depth sensor as described below, and a degree of transparency, which is difficult to acquire depth information by a depth sensor. The object being transparent may include not only a case where the entire object is transparent, but also a case where an area of a preset ratio or more of the entire area of the object is transparent. If the "wine glass" as shown in FIGS. 2 and 3 is a transparent wine glass, the wine glass may be identified as a transparent object through a second neural network model according to the disclosure.

As described above, the second neural network model according to the disclosure may identify whether an object is symmetrical as well as whether an object is transparent. A process of identifying whether an object is symmetrical through a second neural network model will be described with reference to FIG. 5.

As described above, if information about whether an object is transparent is acquired, the electronic device 100 may acquire 3D pose information on an object by different methods according to whether an object is transparent.

As a result of identification, if the identification result object is a transparent object in operation S140-Y, the electronic device 100 may perform stereo matching based on the two-dimensional pose information for each of the plurality of images to acquire 3D pose information of the object in operation S150. For example, since it is difficult to acquire depth information for the object if the object is a transparent object, the electronic device 100 may acquire three-dimensional pose information by using the two-dimensional pose information for each of the plurality of images.

"Three-dimensional pose information" is a term for collectively referring to information capable of specifying the pose of an object in three dimensions. The three-dimensional pose information may include information on three-dimensional coordinate values of pixels corresponding to a preset feature point among pixels constituting an object. For example, the three-dimensional pose information may be provided in the form of a depth map including information on the depth of the object.

The "stereo matching" refers to one of methods capable of acquiring three-dimensional pose information based on two-dimensional pose information. Specifically, the stereo matching process may be performed through a process of acquiring three-dimensional pose information based on a displacement difference between two-dimensional pose information acquired from each of a plurality of images. A stereo matching process in a wide meaning may include a process of acquiring two-dimensional pose information in each of a plurality of images, but in describing the disclosure, two-dimensional pose information is used to refer to a subsequent process.

For example, when an object included in a plurality of images is located close to a camera, a large displacement difference is shown between the plurality of images, and when an object included in the plurality of images is located away from the camera, a small displacement difference between the plurality of images is shown. Therefore, the electronic device 100 may reconstruct 3D pose information based on a displacement difference between a plurality of images. Here, the term "displacement" may refer to a disparity indicating a distance between feature points corresponding to each other in a plurality of images.

Specifically, the electronic device 100 may identify feature points corresponding to each other in a plurality of images. For example, the electronic device 100 may identify feature points corresponding to each other in a plurality of images by calculating a similarity between feature points based on at least one of luminance information, color information, and gradient information of each pixel of the plurality of images. When corresponding feature points are identified, the electronic device 100 may acquire disparity information between corresponding feature points based on two-dimensional coordinate information between corresponding feature points.

When disparity information is acquired, the electronic device 100 may acquire 3D pose information based on disparity information, a focal length of the camera, and information on a positional relationship between the cameras at the time when the plurality of images are acquired. Here, the information about the focal length of the camera may be pre-stored in the memory of the electronic device 100, and the information about the positional relationship between the cameras may be determined based on the amount of the vector acquired by subtracting the value indicating the position of the other camera from the value indicating the position of one of the cameras, and may be determined differently depending on the number and positions of the cameras according to the disclosure.

Specifically, when a plurality of images are acquired through a plurality of cameras having a fixed position, the electronic device 100 may acquire information about a positional relationship between the plurality of cameras based on information pre-stored in the memory, and perform stereo matching based on the information.

When a plurality of images are acquired through a plurality of cameras having an unfixed position, the electronic device 100 may periodically or in real time acquire information about a positional relationship between the plurality of cameras, and perform stereo matching based on the acquired information. For example, when the electronic device 100 is implemented as a robot, the robot may acquire image frames while changing the positions of the head camera and the hand camera. The robot may acquire information about a positional relationship between the head camera and the hand camera based on information on joint angles of frames connected to the head camera and the hand camera, respectively, and perform stereo matching based on the acquired information.

When a plurality of images are acquired through one camera while the electronic device 100 moves, the electronic device 100 may determine a positional relationship between the cameras based on the position of the camera at the time when each of the plurality of images is acquired.

If the object is an opaque object as a result of identifying in operation S140-N, the electronic device 100 may acquire three-dimensional pose information for the object based on one image among the plurality of images and depth information corresponding to one image in operation S160. For example, since it is easy to acquire depth information for the object if the object is an opaque object, the electronic device 100 may acquire three-dimensional pose information by using the depth information.

In the disclosure, depth information refers to information indicating a distance between an object and a camera, and in particular, information acquired through a depth sensor. The depth sensor may be included in a camera to be implemented in the form of a depth camera, and may be included in the electronic device 100 as a configuration separate from the camera. For example, the depth sensor may be a time-of-flight (ToF) sensor or an IR depth sensor, but the type of the depth sensor according to the disclosure is not particularly limited. When the depth sensor according to the disclosure is implemented by a TOF sensor, the electronic device 100 may acquire depth information by measuring time of flight of light between a time when, after irradiating the object with light, light is reflected from the object to a time when the reflected light is received by the depth sensor. When the depth information is acquired through the depth sensor, the electronic device 100 may acquire three-dimensional pose information for the object based on one image among the plurality of images and the depth information.

It has been described that there is an object included in a plurality of images, but this is only for convenience of description, and the disclosure is not limited thereto. For example, when the plurality of images include a plurality of objects, the electronic device 100 may apply various embodiments according to the disclosure for each of the plurality of objects. When 3D pose information is acquired by different methods for each of the plurality of objects, the electronic device 100 may combine 3D pose information acquired by different methods to output a 3D depth image including the combined 3D pose information.

It has been described that the first neural network model and the second neural network model are implemented as separate independent neural network models, respectively, but the first neural network model and the second neural network model may be included in one integrated neural network model. In addition, when the first neural network model and the second neural network model are implemented as one integrated neural network model, the pipeline of the one integrated neural network model may be jointly trained with an end-to-end.

When a video sequence is acquired through at least one camera, the electronic device 100 may acquire three-dimensional pose information in a method as described above with respect to some image frames among image frames included in a video sequence, and acquire pose information on the entire image frame by tracking pose information for the remaining image frames based on the acquired three-dimensional pose information. In this case, a predefined filter, such as a Kalman filter, may be used in tracking pose information.

According to an embodiment with reference to FIGS. 1 to 3, the electronic device 100 may acquire 3D pose information of an object based on an efficient method according to whether an object included in an image is a transparent object.

Figure 4:
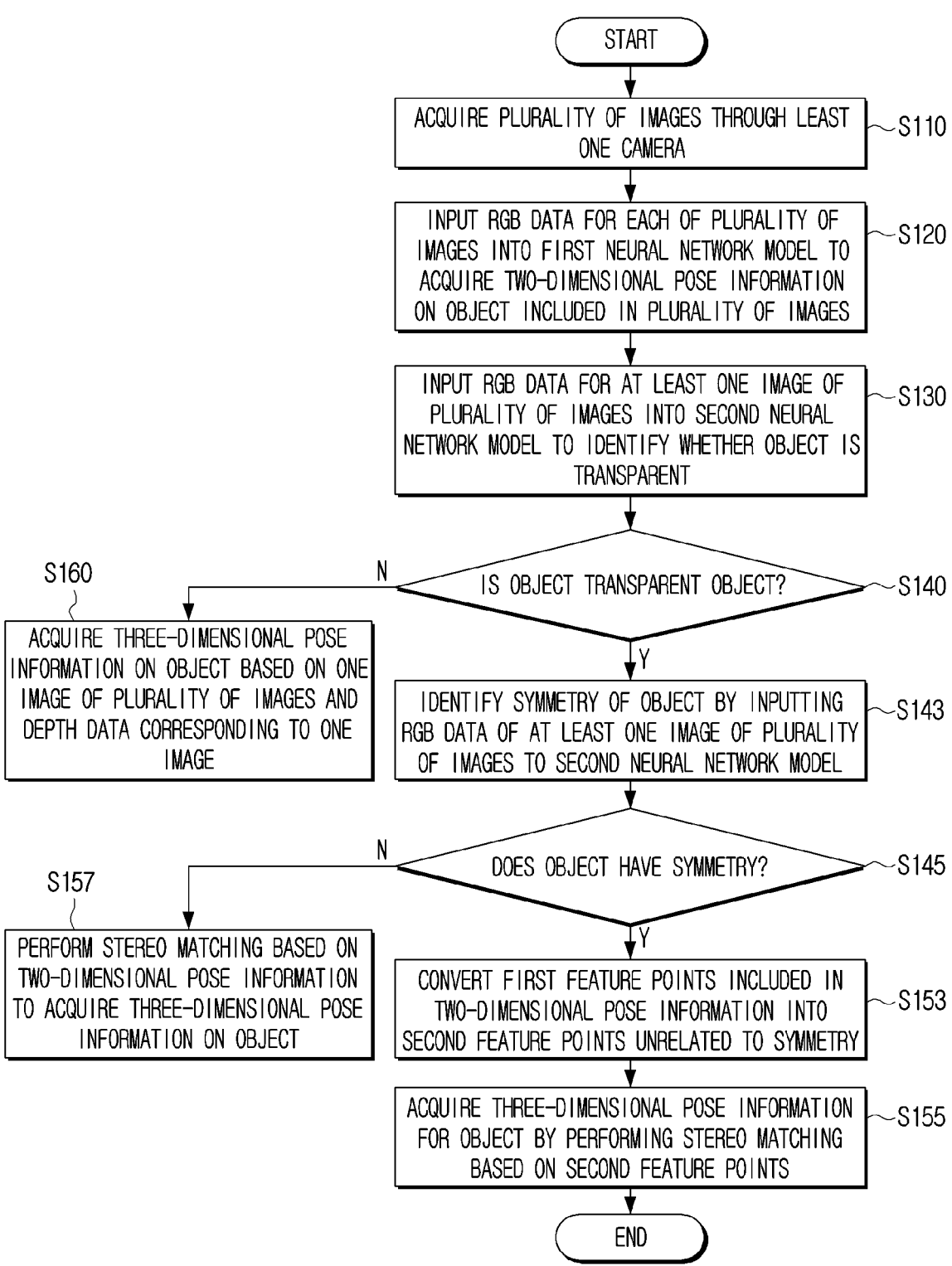
FIG. 4 is a flowchart illustrating a method for controlling an electronic device according to an embodiment of the disclosure.

FIG. 4 is a flowchart illustrating a method for controlling an electronic device according to an embodiment of the disclosure.

Figure 5:
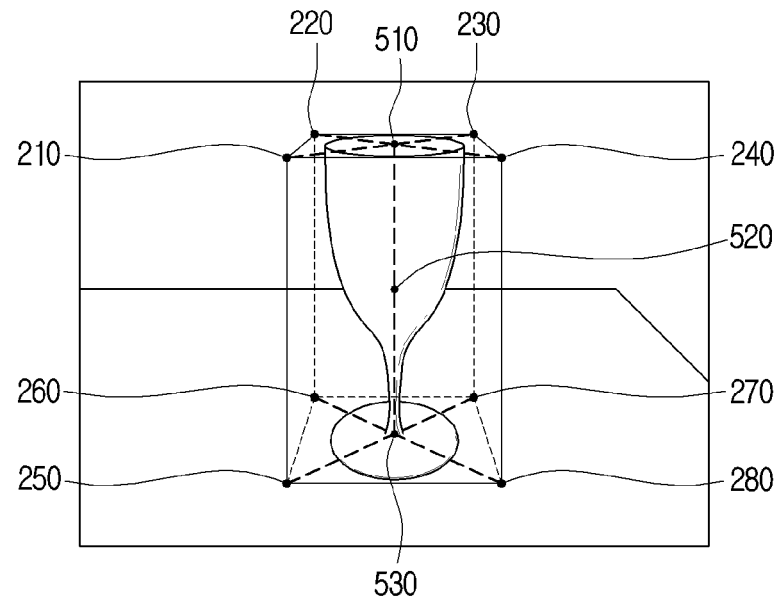
FIGS. 5 and 6 are diagrams for describing an embodiment in which an object has symmetry according to various embodiments of the disclosure.
Figure 6:
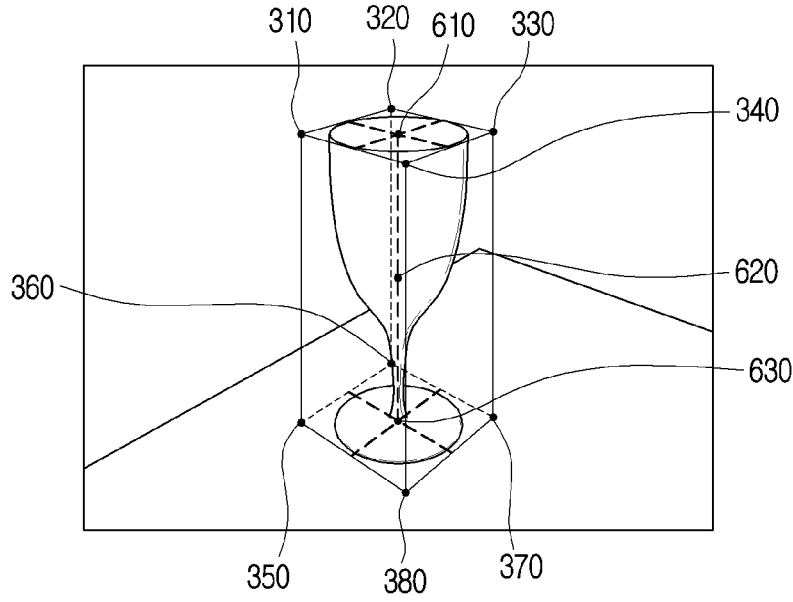

FIGS. 5 and 6 are diagrams illustrating an embodiment in which an object has symmetry according to various embodiments of the disclosure.

As described above, the electronic device 100 according to the disclosure may not only acquire 3D information in a different manner depending on whether an object included in a plurality of images is transparent, but also acquire 3D information in a different manner depending on whether a plurality of objects are symmetrical. FIG. 4 is a diagram illustrating a method of acquiring 3D information in a different manner depending on whether an object is transparent or not, and a method of acquiring 3D information in a different manner depending on whether an object is symmetrical. As described above with reference to FIG. 1, a method of acquiring 3D information in a different manner according to whether an object is transparent will be described with reference to FIG. 1.

Referring to FIG. 4, the electronic device 100 may identify whether an object is symmetrical based on RGB data for at least one image from among a plurality of images in operation S143. Referring to FIG. 4, it is illustrated that only when the object is a transparent object in operation S140-Y, whether the object is symmetrical is identified, but the disclosure is not limited thereto.

Specifically, the electronic device 100 may acquire information about whether an object is symmetrical through a second neural network model, and acquire whether the object is symmetrical based on the information about the symmetry of the object. In describing the disclosure, that object is "symmetrical" refers to a case in which symmetry in a 360-degree direction is satisfied with respect to at least one axis passing through an object.

When an object included in a plurality of images is "wine glass" as illustrated in FIGS. 5 and 6, when the object included in the plurality of images satisfies the symmetry in the 360-degree direction with respect to an axis passing through the center of the wine glass, the object may be identified as a symmetric object through the second neural network model.

Based on the object being an object having symmetry as a result of identification in operation S145-Y, the method includes converting first feature points included in the two-dimensional pose information into second feature points unrelated to symmetry in operation S153; and acquiring three-dimensional pose information for the object by performing the stereo matching based on the second feature points in operation S155.

Here, "first feature points" refers to feature points as described with reference to FIGS. 2 and 3, and "second feature points" refers to feature points obtained by converting first feature points into feature points irrelevant to symmetry.

Referring to FIG. 5, the electronic device 100 may convert first feature points, which are eight vertices (210, 220, 230, 240, 250, 260, 270, 280) constituting a three-dimensional bounding box corresponding to a wine glass, into second feature points, which are three points (510, 520, 530) on an axis passing through the center of a wine glass, and perform stereo matching based on the second feature points to obtain 3D pose information for a wine glass.

Referring to FIG. 6, the electronic device 100 may convert first feature points, which are eight vertices (310, 320, 330, 340, 350, 360, 370, 380) constituting a three-dimensional bounding box corresponding to a wine glass, into second feature points, which are three points (610, 620, 630) on an axis passing through the center of a wine glass, and perform stereo matching based on the second feature points to obtain 3D pose information about the wine glass.

In the case of an object having symmetry, a criterion for identifying the first feature point needs to be specified since the number of bounding boxes corresponding to the object may be infinite. For example, referring to FIGS. 5 and 6, if a bounding box having an axis passing through a center portion of a wine glass as a z-axis is a bounding box corresponding to a wine glass, the bounding boxes may all be bounding boxes corresponding to a wine glass.

Accordingly, in constructing learning data for learning a first neural network model, annotation may be performed based on a three-dimensional coordinate system in which an x-axis or a y-axis is perpendicular to a camera in the case of an object having symmetry. Accordingly, the electronic device 100 may identify a first feature point based on a three-dimensional coordinate system in which an x-axis or a y-axis is perpendicular to the camera through a trained first neural network model. Specifically, if an object included in an image is an object having symmetry, the electronic device 100 may identify a bounding box corresponding to the object based on a three-dimensional coordinate system in which an x-axis or a y-axis is perpendicular to the camera, and identify eight vertices constituting the identified bounding box as the first feature point. For example, the electronic device 100 may identify the first feature points under consistent criteria for an object having symmetry.

As a result of identification, if an object does not have symmetry in operation S145-N, the electronic device 100 may perform stereo matching based on first feature points included in the two-dimensional pose information to obtain 3D pose information of the object in operation S157. For example, in the case of an object that does not have symmetry, since the first feature points have directivity, the electronic device 100 may perform stereo matching based on the first feature points without converting the first feature points to the second feature points.

According to the embodiment described above with reference to FIGS. 4 to 7, the electronic device 100 may obtain 3D pose information of an object in an efficient manner according to whether an object included in the image is an object having symmetry.

The control method of the electronic device 100 may be implemented as a program and provided to the electronic device 100. Specifically, programs including the control method of the electronic device 100 may be stored in a non-transitory computer readable medium.

A non-transitory computer readable recoding medium including a program for executing the control method of the electronic device 100, the method of controlling the electronic device 100 includes acquiring plurality of images through the least one camera; inputting RGB data for each of the plurality of images into a first neural network model to obtain two-dimensional pose information on an object included in the plurality of images; inputting RGB data for at least one image of the plurality of images into a second neural network model to identify whether the object is transparent; based on the object being a transparent object, performing stereo matching based on the two-dimensional pose information on each of the plurality of images to obtain three-dimensional pose information on the object; and based on the object being an opaque object, acquiring three-dimensional pose information on the object based on one image of the plurality of images and depth information corresponding to the one image.

The method for controlling the electronic device 100 and the computer-readable recording medium including the program for executing the control method of the electronic device 100 have been briefly described above. However, this is merely for omitting the redundant description, and various embodiments of the electronic device 100 may also be applied to a method for controlling the electronic device 100 and a computer-readable recording medium including a program for executing the control method of the electronic device 100.

Figure 7:
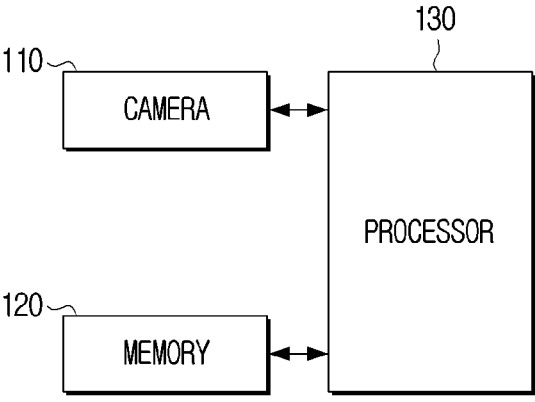
FIG. 7 is a block diagram schematically illustrating a configuration of an electronic device according to an embodiment of the disclosure.

FIG. 7 is a block diagram schematically illustrating a configuration of an electronic device according to an embodiment of the disclosure.

Figure 8:
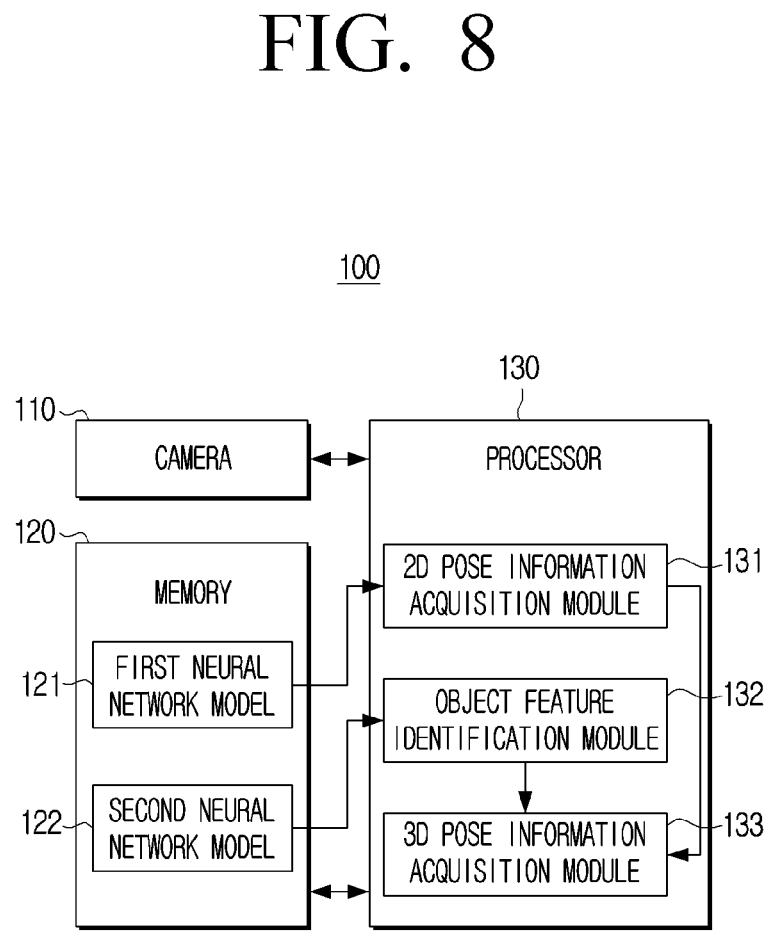

FIG. 8 is a block diagram illustrating neural network models and modules according to an embodiment of the disclosure.

Referring to FIG. 7, the electronic device 100 according to an embodiment of the disclosure includes a camera 110, a memory 120, and a processor 130. In addition, referring to FIG. 8, the processor 130 according to an embodiment of the disclosure may include a plurality of modules, such as a two-dimensional (2D) pose information acquisition module 131, an object feature identification module 132, and a 3D pose information acquisition module 133.

The camera 110 may obtain an image of at least one object. Specifically, the camera 110 may include an image sensor, and the image sensor may convert light entering through the lens into an electrical image signal.

Specifically, the electronic device 100 according to the disclosure may include at least one camera 110, that is, one or more cameras 110. When the electronic device 100 includes two or more cameras 110, the positional relationship between the two or more camera 110 may be fixed and changed. For example, the electronic device 100 may include a camera 110 disposed on the left side of the rear surface of the electronic device 100 and a camera 110 disposed on the right side of the rear surface of the electronic device 100. When the electronic device 100 is implemented as a robot, the at least one camera 110 may include two cameras 110 disposed on each of the head and the hand of the robot, that is, a head camera and a hand camera 110. In this case, as the position of at least one of the head camera 110 and the hand camera 110 is changed, the positional relationship between the two cameras 110 may be changed.

The camera 110 according to the disclosure may include a depth sensor together with an image sensor as a depth camera. Here, the depth sensor may be a time fix-of-flight (ToF) sensor or an infrared (IR) depth sensor, but the type of the depth sensor according to the disclosure is not particularly limited.

At least one instruction regarding the electronic device 100 may be stored in the memory 120. In addition, an operating system (O/S) for driving the electronic device 100 may be stored in the memory 120. The memory 120 may store various software programs or applications for operating the electronic device 100 according to various embodiments. The memory 120 may include a semiconductor memory, such as a flash memory, a magnetic storage medium, such as a hard disk, or the like.

Specifically, the memory 120 may store various software modules for operating the display device 100, and the processor 130 may control the operation of the display device 100 by executing various software modules that are stored in the memory 120. For example, the memory 120 may be accessed by the processor 130, and may perform reading, recording, modifying, deleting, updating, or the like, of data by the processor 130.

It is understood that the term memory 120 may be used to refer to any volatile or non-volatile memory, a read only memory (ROM), random access memory (RAM) proximate to or in the processor 130 or a memory card (not shown) (for example, a micro secure digital (SD) card, a memory stick) mounted to the electronic device 100.

More particularly, according to various embodiments according to the disclosure, the memory 120 may include RGB data, depth information, the first neural network model 121, and data about the second neural network model 122 for each image according to the disclosure. Various information required within a range for achieving the purpose of the disclosure may be stored in the memory 120, and the information stored in the memory 120 may be received from an external device or may be updated as input by a user.

The processor 130 controls overall operations of the display device 100. Specifically, the processor 130 is connected to a configuration of the display device 100 including the camera 110 and the memory 120, or the like, and controls overall operations of the display device 100 by executing at least one instruction stored in the memory 120 as described above.

The processor 130 may be implemented in various ways. For example, the processor 130 may be implemented as at least one of an application specific integrated circuit (ASIC), an embedded processor, a microprocessor, a hardware control logic, a hardware finite state machine (FSM), a digital signal processor (DSP), or the like. Further, processor 130 may include at least one of a central processing unit (CPU), a graphic processing unit (GPU), a main processing unit (MPU), or the like.

More particularly, in various embodiments according to the disclosure, the processor 130 may acquire a plurality of images through at least one camera 110, and obtain three-dimensional pose information for an object included in the plurality of images through the plurality of modules.

A 2D pose information acquisition module 131 refers to a module capable of acquiring two-dimensional pose information for an object included in an image based on RGB data for an image. More particularly, the 2D pose information acquisition module 131 may acquire 2D pose information of an object included in an image by using the first neural network model 121 according to the disclosure. As described above, the first neural network model 121 refers to a neural network model trained to output two-dimensional pose information for an object included in an image based on input RGB data, and the processor 130 may use the first neural network model 121 by accessing data for the first neural network model 121 stored in the memory 120. Specifically, the 2D pose information acquisition module 131 may detect a bounding box corresponding to each object included in an image through a first neural network model 121, and obtain two-dimensional coordinate information of each of preset feature points constituting the detected bounding box as two-dimensional pose information.

"Object feature identification module 132" refers to a module capable of identifying features of an object included in an image. More particularly, the object feature identification module 132 may identify features of an object included in an image by using a second neural network model 122 according to the disclosure. As described above, the second neural network model 122 refers to a neural network model trained to classify features of an object included in an image and output the result, and the processor 130 may use the second neural network model 122 by accessing data for the second neural network model 122 stored in the memory 120. Specifically, the object feature identification module 132 may obtain, through the second neural network model 122, information about a probability that an object included in the image corresponds to each of a plurality of classes (or categories and domains) divided according to various features of the image, and identify a feature of an object included in the input image based on the information. Here, the plurality of classes may be predefined according to features, such as whether the object is transparent and whether the object is symmetrical.

"A 3D pose information acquisition module 133 refers to a module capable of acquiring three-dimensional pose information for an object by reconstructing two-dimensional pose information for an object. More particularly, the 3D pose information acquisition module 133 may acquire 3D pose information in different ways according to features of the object. Specifically, when 2D pose information is received through the 2D pose information acquisition module 131, and information indicating an object in which the object is transparent is received through the object feature identification module 132, the 3D pose information acquisition module 133 may perform stereo matching based on the two-dimensional pose information for each of the plurality of images to obtain 3D pose information for the object. When 2D pose information is received through the 2D pose information acquisition module 131, and information indicating an object in which the object is opaque is received through the object feature identification module 132, the 3D pose information acquisition module 133 may obtain 3D pose information of the object based on one image among the plurality of images and depth information corresponding to one image.

Various embodiments of the disclosure based on control of the processor 130 have been described with reference to FIGS. 1 to 6 and a duplicate description will be omitted.

Figure 9:
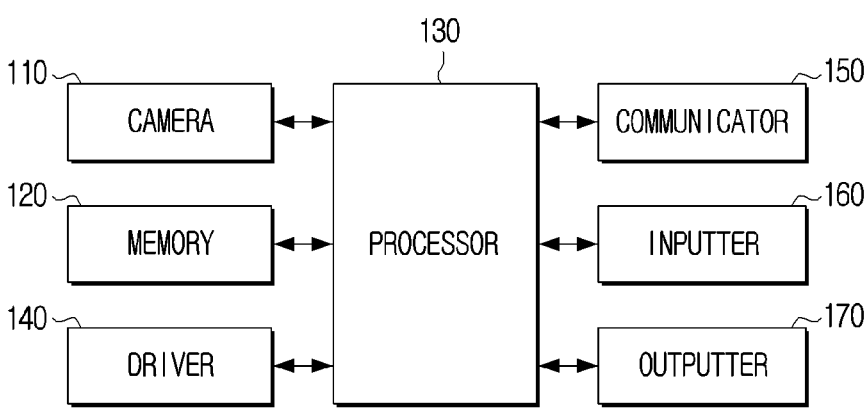
FIG. 9 is a block diagram specifically illustrating a configuration of an electronic device according to an embodiment of the disclosure.

FIG. 9 is a block diagram specifically illustrating a configuration of an electronic device according to an embodiment of the disclosure.

Referring to FIG. 9, the electronic device 100 according to an embodiment of the disclosure may further include a driver 140, a communicator 150, an inputter 160, and an outputter 170 as well as the camera 110, the memory 120, and the processor 130. However, the configurations as shown in FIGS. 7 to 9 are merely illustrative, and in implementing the disclosure, a new configuration may be added or some components may be omitted in addition to the features illustrated in FIGS. 7 to 9.

The driver 140 generates power for implementing various operations of the electronic device 100 based on the driving data. The power generated by the driver 140 may be transmitted to a support part (not shown) physically connected to the driver 140 to move the support part (not shown), and thus various operations of the electronic device 100 may be implemented.

Specifically, the driver 140 may include a motor for generating a torque of a predetermined torque based on electric energy supplied to the electronic device 100, and may include a piston or a cylinder device for generating a rotational force based on hydraulic pressure or air pressure supplied to the electronic device 100. The supporting part (not shown) may include a plurality of joints connecting the plurality of joints and the plurality of joints, and may be implemented in various shapes to perform various operations of the electronic device 100. The electronic device 100 according to the disclosure may include a plurality of drivers 140 or a plurality of support units (not shown). Furthermore, the number of components included in each driver 140 and the support unit (not shown) is not limited to a special number.

More particularly, according to various embodiments according to the disclosure, the processor 130 may control the driver 140 such that the position of at least one of the first camera 110 and the second camera 110 is changed. Specifically, when the driver 140 is controlled by the processor 130, the position of at least one camera 110 connected to the support unit (not shown) may be changed. When the position of the at least one camera 110 is changed, the processor 130 may acquire position information about a positional relationship between the first camera 110 and the second camera 110 based on the changed position of the at least one camera 110, and perform stereo matching based on the two-dimensional pose information for each of the plurality of images and the acquired position information.

The communicator 150 includes a circuit and may communicate with an external device. Specifically, the processor 130 may receive various data or information from an external device connected through the communicator 150, and may transmit various data or information to an external device.

The communicator 150 may include at least one of a wireless fidelity (Wi-Fi) module, a Bluetooth module, a wireless communication module, and a near field communication (NFC) module. To be specific, the Wi-Fi module may communicate by a Wi-Fi method and the Bluetooth module may communicate by a Bluetooth method. When using the Wi-Fi module or the Bluetooth module, various connection information, such as service set identifier (SSID) may be transmitted and received for communication connection and then various information may be transmitted and received.

The wireless communication module may perform communication according to various communication standards, such as institute of electrical and electronics engineers (IEEE), Zigbee, $3^{rd}$ generation (3G), third generation partnership project (3GPP), long term evolution (LTE), $5^{th}$ generation (5G), or the like. NFC module may communicate in NFC using, for example, a 13.56 megahertz (MHz) band among various radio frequency identification (RF-ID) frequency bands, such as 135 kilohertz (kHz), 13.56 MHz, 433 MHz, 860 to 960 MHz, 2.45 gigahertz (GHz), or the like.

More particularly, in various embodiments according to the disclosure, the processor 130 may receive a plurality of images from an external device (e.g., a user terminal) through the communicator 150. For example, although a case in which a plurality of images are acquired through at least one camera 110 has been described above, a plurality of images according to the disclosure may be acquired by the camera 110 included in an external device and then transmitted to the electronic device 100.

The first neural network model 121 and the second neural network model 122 are stored in the memory 120 of the electronic device 100 and operate as an on-device, but at least one of the first neural network model 121 and the second neural network model 122 may be implemented through an external device (e.g., a server). In this case, the processor 130 may control the communicator 150 to transmit data on a plurality of images to an external device, and may receive information corresponding to an output of at least one of the first neural network model 121 and the second neural network model 122 from an external device through the communicator 150.

If the electronic device 100 according to the disclosure includes the driver 140, the processor 130 may receive driving data for controlling the driver 140 from an external device (e.g., an edge computing device) through the communicator 150, and control the operation of the driver 140 based on the received driving data.

The inputter 160 includes a circuit and the processor 130 may receive a user command for controlling the overall operation of the electronic device 100 through the inputter 160. To be specific, the inputter 160 may include a microphone (not shown), a remote control signal receiver (not shown), or the like. The inputter 160 may be implemented with a touch screen that is included in the display.

More particularly, in various embodiments according to the disclosure, the inputter 160 may receive various types of user inputs, such as a user input for acquiring a plurality of images, a user input for acquiring a depth map including three-dimensional pose information for the object, and the like.

The outputter 170 may include a circuit and the processor 130 may output various functions that the electronic device 100 may perform. The outputter 170 may include at least one of a display, a speaker, and an indicator. The display may output image data under the control of the processor 130. For example, the display may output an image pre-stored in the memory 120 under the control of the processor 130. More particularly, the display according to an embodiment may display a user interface stored in the memory 120. The display may be implemented as a liquid crystal display panel (LCD), organic light emitting diode (OLED) display, or the like, and the display may be implemented as a flexible display, a transparent display, or the like, according to use cases. The display according to the disclosure is not limited to a specific type. The speaker may output audio data by the control of the processor 130, and the indicator may be lit by the control of the processor 130.

More particularly, in various embodiments according to the disclosure, the outputter 170 may output a plurality of images acquired through at least one camera 110, two-dimensional pose information for an object included in the plurality of images, a depth map including three-dimensional pose information for the object, and the like.

According to various embodiments of the disclosure as described above, the electronic device 100 may acquire 3D pose information about an object in an efficient manner according to features of an object included in the image.

A function related to the first neural network model 121 and the second neural network model 122 may be performed by the memory 120 and the processor 130. The processor 130 may include one or a plurality of processors. The one or a plurality of processors 130 may be a general purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU).

The one or a plurality of processors 130 control the processing of the input data in accordance with a predefined operating rule or artificial intelligence (AI) model stored in the non-volatile memory and the volatile memory of the memory 120. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model according to the disclosure may be including a plurality of neural network layers. Each layer has a plurality of weight values, and performs a layer operation through calculation of a previous layer and an operation of a plurality of weights. Examples of neural networks may include, but are not limited to, a convolutional neural network (CNN), a deep neural network (DNN), a recurrent neural network (RNN), a Restricted Boltzmann Machine Task (RBM), a deep belief network (DBN), a bidirectional deep neural network (BRDNN), generative adversarial networks (GAN), and deep Q-networks, and the neural network in the disclosure is not limited to the above-described example except when specified.

The learning algorithm is a method for training a predetermined target device (e.g., a robot) using a plurality of learning data to make a determination or prediction of a predetermined target device by itself. Examples of learning algorithms include supervised learning, unsupervised learning, semi-supervised learning, or reinforcement learning, and the learning algorithm in the disclosure is not limited to the examples described above except when specified.

The machine-readable storage medium may be provided in the form of a non-transitory storage medium. The, "non-transitory" storage medium may not include a signal (e.g., electromagnetic wave) and is tangible, but does not distinguish whether data is permanently or temporarily stored in a storage medium. For example, the "non-transitory storage medium" may include a buffer in which data is temporarily stored.

According to an embodiment of the disclosure, the method according to the above-described embodiments may be provided as being included in a computer program product. The computer program product may be traded as a product between a seller and a consumer. The computer program product may be distributed online in the form of machine-readable storage media (e.g., a compact disc read only memory (CD-ROM)) or through an application store (e.g., Play Store™ and App Store™) or distributed online (e.g., downloaded or uploaded) directly between to users (e.g., smartphones). In the case of online distribution, at least a portion of the computer program product may be at least temporarily stored or temporarily generated in a server of the manufacturer, a server of the application store, or a machine-readable storage medium, such as memory of a relay server.

Each of the elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration.

Operations performed by a module, a program, or another element, in accordance with various embodiments of the disclosure, may be performed sequentially, in a parallel, repetitively, or in a heuristically manner, or at least some operations may be performed in a different order, omitted or a different operation may be added.

The term "unit" or "module" used in the disclosure includes units includes hardware, software, or firmware, or any combination thereof, and may be used interchangeably with terms, such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

Embodiments may be implemented as software that includes instructions stored in machine-readable storage media readable by a machine (e.g., a computer). A device may call instructions from a storage medium and that is operable in accordance with the called instructions, including an electronic device (e.g., the electronic device 100).

When the instruction is executed by a processor, the processor may perform the function corresponding to the instruction, either directly or under the control of the processor, using other components. The instructions may include a code generated by a compiler or a code executed by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one camera;
   memory storing instructions; and
   at least one processor communicatively coupled to the at least one camera and the memory,
   wherein the instructions, when executed by the at least one processor individually or collectively, cause the electronic device to:
   acquire plurality of images through the at least one camera,
   input red green blue (RGB) data for each of the plurality of images into a first neural network model to acquire two-dimensional pose information on an object included in the plurality of images,
   input RGB data for at least one image of the plurality of images into a second neural network model to identify a state of the object as a transparent object or an opaque object,
   based on the object being the transparent object, perform stereo matching based on the two-dimensional pose information on each of the plurality of images to acquire three-dimensional pose information on the object,
   based on the object being the opaque object, acquire three-dimensional pose information on the object based on one image of the plurality of images and depth information corresponding to the one image, acquire information on whether the object is symmetrical through the second neural network model, identify whether the object is symmetrical based on the information on whether the object is symmetrical, based on the object being an object having symmetry, convert first feature points included in the two-dimensional pose information into second feature points unrelated to symmetry, and acquire three-dimensional pose information for the object by performing the stereo matching based on the second feature points.

2. The electronic device of claim 1, wherein the instructions, when executed by the at least one processor individually or collectively, further cause the electronic device to:

acquire information about transparency of the object through the second neural network model, and identify transparency of the object based on the information about the transparency of the object.

3. The electronic device of claim 1, wherein, based on the object being an object having symmetry, the first feature points are identified based on a three-dimensional coordinate system in which x-axis or y-axis is perpendicular to the at least one camera.

4. The electronic device of claim 1, wherein the plurality of images are two images acquired at two different points in time through a first camera among the at least one camera.

5. The electronic device of claim 4, wherein the plurality of images are two images acquired at same points in time through each of the first camera and a second camera among the at least one camera.

6. The electronic device of claim 5, wherein the instructions, when executed by the at least one processor individually or collectively, further cause the electronic device to:

acquire first location information about a positional relationship between the first camera and the second camera, and perform the stereo matching based on the two-dimensional pose information for each of the plurality of images and the first location information.

7. The electronic device of claim 6, further comprising: a driver, wherein the instructions, when executed by the at least one processor individually or collectively, further cause the electronic device to:

control the driver to change a position of at least one of the first camera and the second camera, acquire second position information about a positional relationship between the first camera and the second camera based on the changed position of the at least one camera, and perform the stereo matching based on the two-dimensional pose information for each of the plurality of images and second location information.

8. The electronic device of claim 1, wherein the first neural network model and the second neural network model are included in one integrated neural network model.

9. The electronic device of claim 1, wherein the two-dimensional pose information includes a bounding box corresponding to each object included in an image through a first neural network model.

10. A method performed by an electronic device, the method comprising:

acquiring, by the electronic device, plurality of images through at least one camera;

inputting, by the electronic device, red green blue (RGB) data for each of the plurality of images into a first neural network model to acquire two-dimensional pose information on an object included in the plurality of images;

inputting, by the electronic device, RGB data for at least one image of the plurality of images into a second neural network model to identify a state of the object as a transparent object or an opaque object;

based on the object being the transparent object, performing, by the electronic device, stereo matching based on the two-dimensional pose information on each of the plurality of images to acquire three-dimensional pose information on the object; and based on the object being the opaque object, acquiring, by the electronic device, three-dimensional pose information on the object based on one image of the plurality of images and depth information corresponding to the one image, acquiring information on whether the object is symmetrical through the second neural network model; and identifying whether the object is symmetrical based on the information on whether the object is symmetrical, wherein the method of the electronic device further comprises:

based on the object being an object having symmetry, converting first feature points included in the two-dimensional pose information into second feature points unrelated to symmetry, and acquiring three-dimensional pose information for the object by performing the stereo matching based on the second feature points.

11. The method of claim 10, wherein identifying transparency of the object comprises:

acquiring information about transparency of the object through the second neural network model; and identifying transparency of the object based on the information about the transparency of the object.

12. The method of claim 10, wherein, based on the object being an object having symmetry, the first feature points are identified based on a three-dimensional coordinate system in which x-axis or y-axis is perpendicular to the at least one camera.

13. The method of claim 10, wherein the plurality of images are two images acquired at two different points in time through a first camera among the at least one camera.

14. The method of claim 13, wherein the plurality of images are two images acquired at same points in time through each of the first camera and a second camera among the at least one camera.

* * * * *